May 10, 1949.  J. W. BYER  2,469,592
LOCKING DEVICE
Filed Feb. 6, 1948
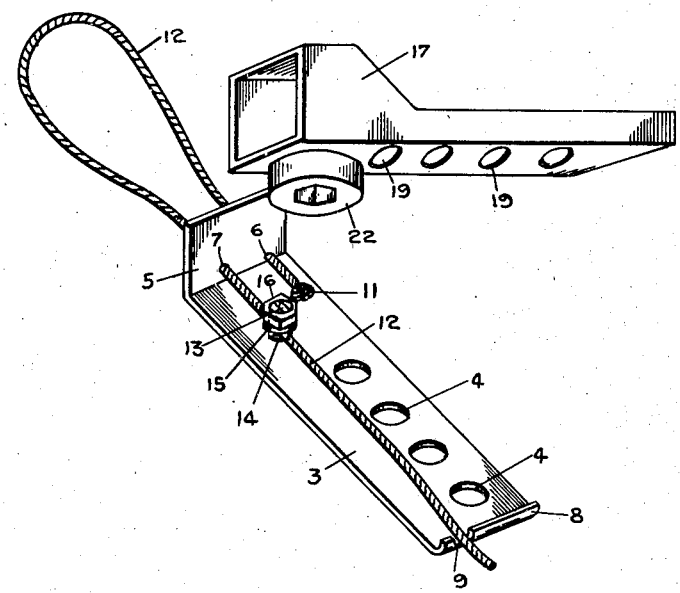
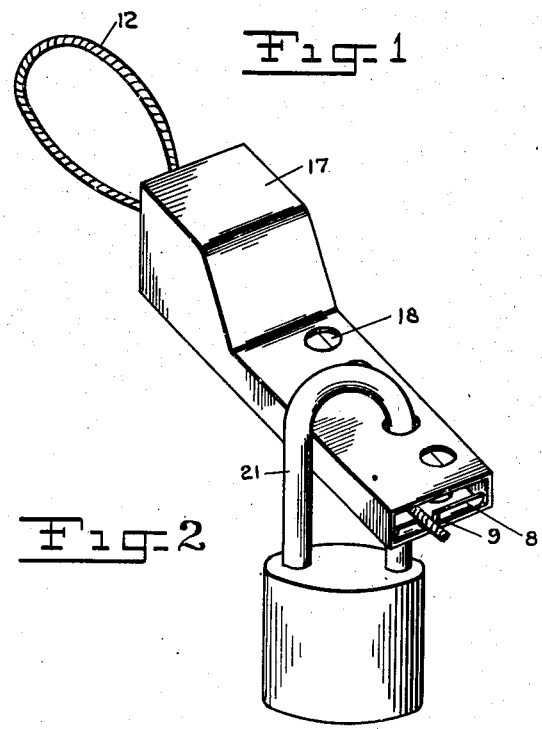
INVENTOR.
J. W. BYER.
BY
ATTORNEYS.

Patented May 10, 1949

2,469,592

UNITED STATES PATENT OFFICE 2,469,592

LOCKING DEVICE

John Walter Byer, Cumberland, Md., assignor to Celanese Corporation of America, a corporation of Delaware Application February 6, 1948, Serial No. 6,791

5 Claims. (Cl. 70—65)

This invention relates to locking devices, and relates more particularly to a novel lock sling adapted for use in sealing certain elements against undesirable or unauthorized use.

It is often desirable, and sometimes even necessary to prevent serious accidents, to lock certain elements, such as electrical switches, valves, machine parts, etc., to prevent the same from being opened or placed in operation prematurely, or by unauthorized persons.

It is an object of this invention to provide a simple, inexpensive and effective lock sling adapted for use in sealing electrical switches, valves, machine parts, etc., against undesirable or unauthorized use.

Other objects of this invention, together with certain details of construction and combinations of parts, will appear from the following detailed description.

In the accompanying drawing,

Fig. 1 is a perspective view of the lock sling of this invention, unassembled, and Fig. 2 is a perspective view of the lock sling, assembled and showing one lock employed therewith.

Like numerals indicate like parts throughout both views of the drawing.

Referring to the drawing for a detailed description of the lock sling of this invention, the reference numeral 3 indicates a plate having a plurality of openings 4 therein. One end 5 of said plate 3 is bent substantially at right angles thereto and is provided with apertures 6 and 7, while the other end 8 is curved upwardly and is provided with a notch 9.

To the plate 3, as indicated at 11, is welded one end of a metallic wire rope 12. The free end of said wire rope is passed through aperture 6 in end plate 5, is looped (through or about an element) and then passed through aperture 7 in end plate 5 and returned to plate 3. The latter portion of wire rope 12 is passed through a slot 13 provided in a threaded stud 14 which is fixed to plate 3. The free end of the wire rope 12, if long enough, is placed in notch 9.

To hold the wire rope securely in the sling, there is provided a washer 15 and a nut 16 which is adapted to be threaded on to stud 14. When the nut 16 is tightened by a suitable wrench, pressure is brought to bear on the washer 15 which in turn applies pressure on the wire rope and maintains the same fixed to the sling.

After properly locating the wire rope 12 on the equipment it is desired to seal, and fixing the wire rope on plate 3, a cover, generally indicated by reference numeral 17, comprising a box-like structure of any suitable metal and having registering openings 18 and 19 in the top and bottom plates thereof, respectively, is slipped over the plate 3 and the assembly secured by a lock 21 passing through openings 18, 4 and 19. A plurality of locks may be employed, depending upon the number of men working and/or the type of work being carried out on a particular job.

The plate cover 17 may have suitably fixed thereto a wrench-head 22 for use in tightening nut 16.

The present invention is applicable where different types of work, such as welding, pipe fitting, rigging, etc., are being done on the same line. The present lock sling can be used to seal the control valve, for example, and the several workers involved on the particular job each will have his own lock on the sling. To open the valve, therefore, the lock sling must be cleared of all locks. Accordingly, the present invention furnishes a foolproof safety device for preventing premature opening of valves controlling steam and flammable and poisonous materials, and of switches controlling flow of electricity and the starting up of machines. It also prevents the placing of chemical systems in operation prematurely, thus avoiding the loss of valuable materials.

It is to be understood that the foregoing detailed description is given merely by way of illustration and that many variations may be made therein without departing from the spirit of my invention.

Having described my invention, what I desire to secure by Letters Patent is:

1. A lock sling comprising a plate having an opening therein, a rope having one end fixed to said plate, means for securing the other end of said rope to said plate, and a cover having an opening therein removably mounted on said plate, said openings in said plate and said cover being adapted to receive a lock for locking the plate and cover assembly.

2. A lock sling comprising a plate having an opening therein, a wire rope having one end fixed to said plate, means for detachably securing the other end of said wire rope to said plate, and a cover having an opening therein removably mounted on said plate, said openings in said plate and said cover being adapted to receive a lock for locking the plate and cover assembly.

3. A lock sling comprising a plate having a plurality of openings therein, a wire rope having one end fixed to said plate, means for detachably securing the other end of said wire rope to said plate, and a cover having a plurality of openings therein removably mounted on said plate, said openings in said plate and said cover being adapted to receive a plurality of locks for locking the plate and cover assembly.

4. A lock sling comprising a plate having an opening therein, a rope having one end fixed to said plate, means for securing the other end of said rope to said plate, and a box-like cover, having an opening therein, adapted to receive said plate within the same, said openings in said plate and said cover being adapted to receive a lock for locking the plate and cover assembly.

5. A lock sling comprising a plate having a plurality of openings therein, a wire rope having one end fixed to said plate, means for detachably securing the other end of said wire rope to said plate, and a box-like cover, having a plurality of registering openings therein, adapted to receive said plate within the same, said openings in said plate and said cover being adapted to receive a plurality of locks for locking the plate and cover assembly.

JOHN WALTER BYER.

No references cited.